Jan. 3, 1956  D. B. HERTZ ET AL  2,728,943
EXTRUSION APPARATUS
Filed Sept. 29, 1953  2 Sheets-Sheet 1
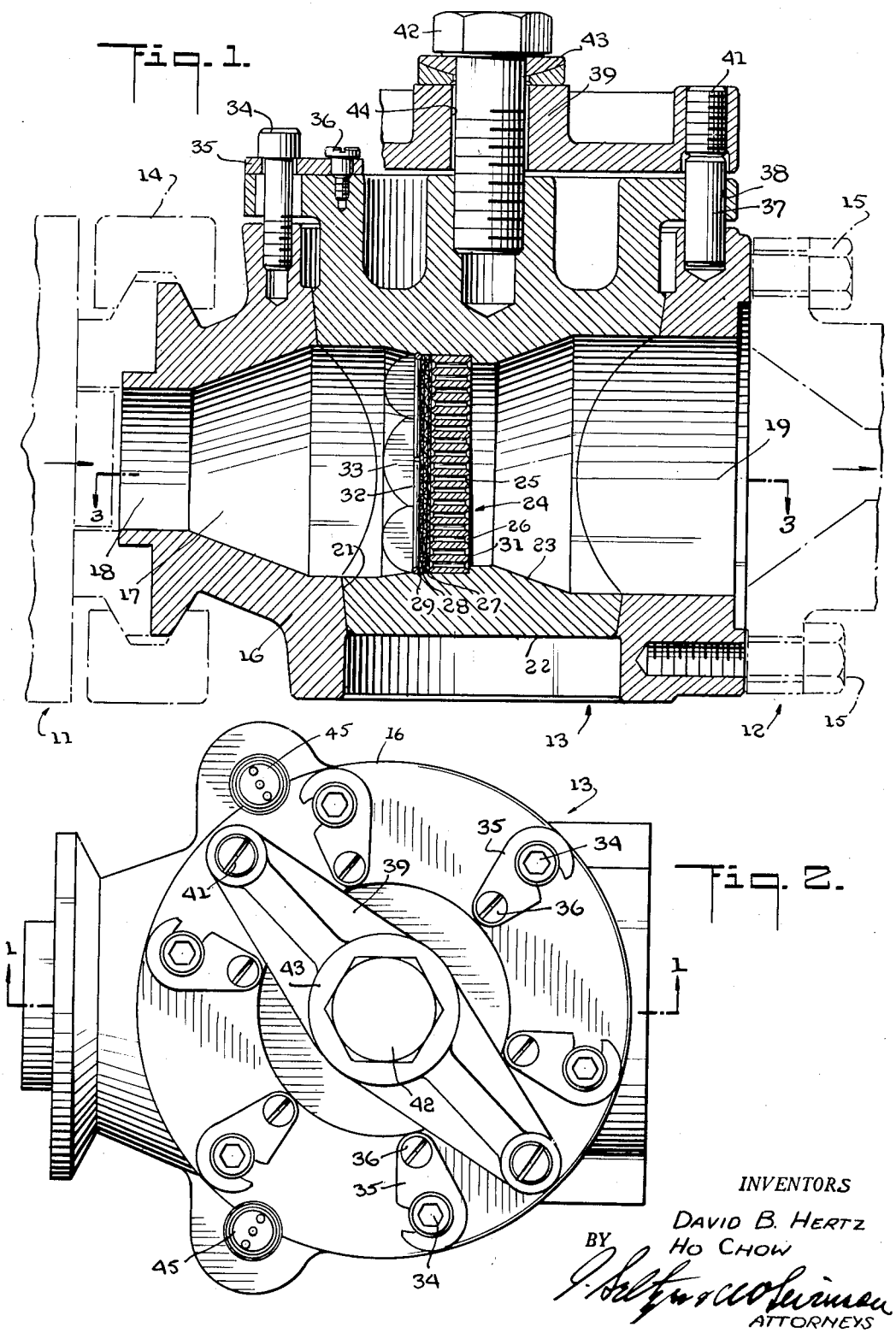
INVENTORS
DAVID B. HERTZ
HO CHOW
BY
ATTORNEYS

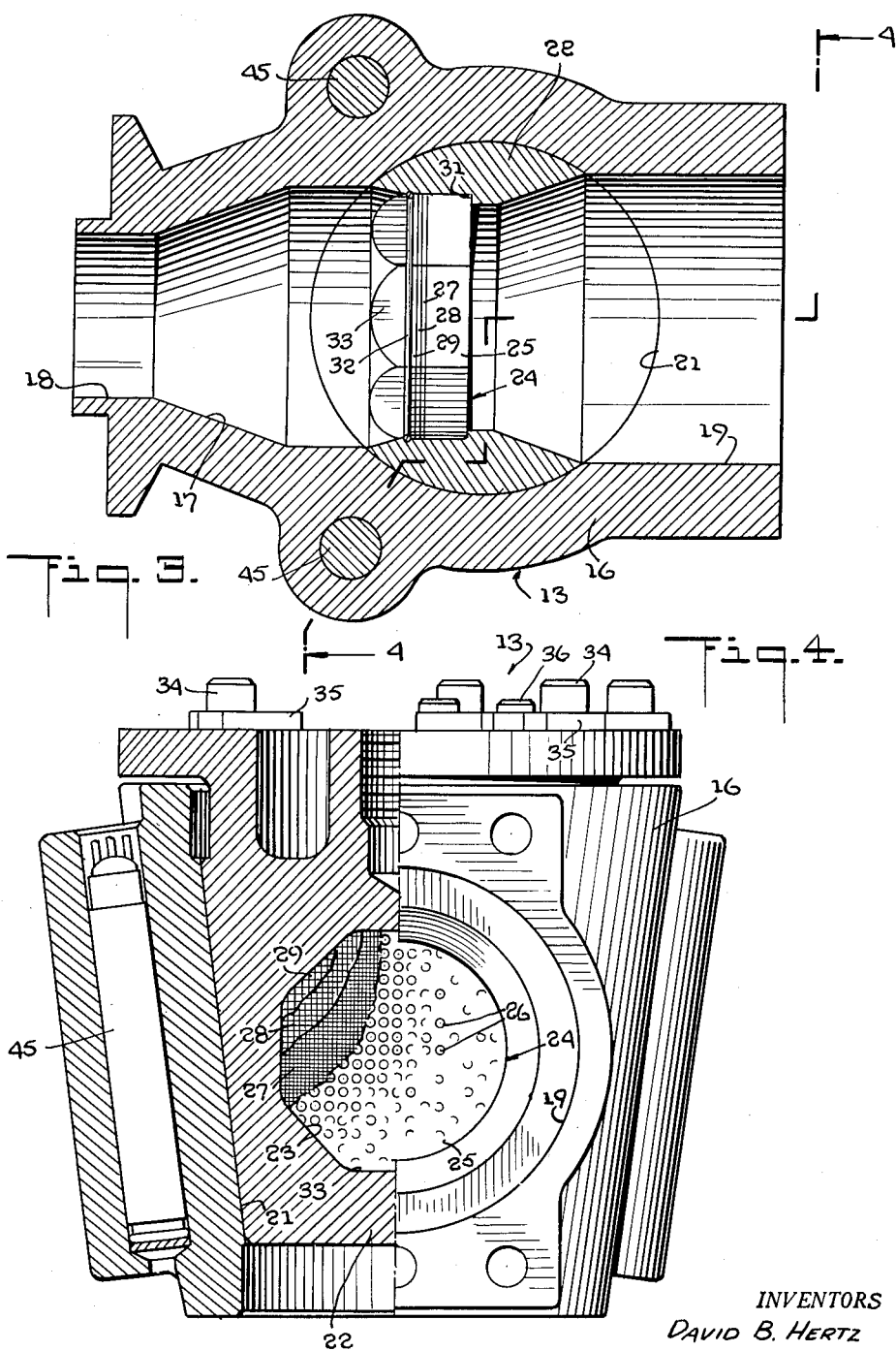

United States Patent Office 2,728,943
Patented Jan. 3, 1956

2,728,943

EXTRUSION APPARATUS

David B. Hertz and Ho Chow, New York, N. Y., assignors to Celanese Corporation of America, New York, N. Y., a corporation of Delaware Application September 29, 1953, Serial No. 383,088

10 Claims. (Cl. 18—12)

This invention relates to extrusion apparatus and relates more particularly to a novel changing mechanism for the filter assembly in an extrusion apparatus.

The type of apparatus generally employed for the extrusion of thermoplastic materials, such as rubber, plastics and the like, comprises an extruder provided with a barrel containing a rotating worm, a feed section at one end of the extruder and a forming die operatively connected to the other or output end of the extruder. The forming die is usually attached to a heavy plate which is hinged on and bolted to another heavy plate welded to the output end of the extruder barrel. Positioned between these two plates, and secured in place by means of bolts holding the plates together, is a filter assembly comprising a breaker plate and, generally, a number of screens of different mesh. The breaker plate is a heavy, perforated steel plate which acts as a supporting member for the relatively thin screens.

The screens in operation filter out from the thermoplastic material foreign particles and lumps of unconverted thermoplastic material. As a result, the screens gradually become clogged and offer an increased resistance to the flow of the thermoplastic material therethrough. Eventually this resistance increases to the point where it is no longer practical to operate the extrusion apparatus because of the decreased output or because of the degradation of the quality of the product. When this occurs, it is necessary to remove and replace the filter assembly, which is a laborious and time consuming operation. As the first steps in replacing the filter assembly, the entire apparatus must be cooled to a temperature suitable for handling and any take-off equipment positioned in front of the extrusion apparatus to receive the product therefrom must be moved to provide sufficient space for the plate carrying the extrusion die to be swung open. Then the bolts securing this plate to the extruder are loosened and the plate swung open. The clogged filter assembly is then removed and a clean filter assembly inserted in its place, following which the plate carrying the extrusion die is swung to the closed position and bolted tight. The take-off equipment is again brought into position in front of the extruder and, because misalignment of this equipment cannot be tolerated in many cases, must often be very accurately aligned with the extrusion die. At times, the removal and replacement of the filter assembly in an extrusion apparatus takes several hours for a skilled operator, during all of which time the extrusion apparatus is out of production.

It is an important object of this invention to provide an extrusion apparatus which will be free from the foregoing and other disadvantages, and which will be especially simple in construction and efficient in operation.

A further object of this invention is to provide a novel changing mechanism for the filter assembly in an extrusion apparatus.

Other objects of this invention, together with certain details of construction and combinations of parts, will be apparent from the following detailed description and claims.

According to the present invention there is provided in an extrusion apparatus means whereby the filter assembly may be removed and replaced whenever necessary in a relatively short time and without removing or disturbing the forming die or take-off or other equipment associated therewith. As a result, the down-time of the extrusion equipment is reduced. In addition, because of the ease with which the filter assembly may be replaced, such replacement can economically be carried out more frequently so that the extruder can be set to operate at a higher rate since a greater flow of material will pass through a clean filter assembly.

In carrying out this invention there is positioned between the extruder and the forming die a filter change mechanism comprising a body portion having a passageway extending therethrough, into the inlet end of which the extruded material flows from the extruder and from the outlet end of which the extruded material flows into the forming die. Extending through the body portion at right angles to the passageway is a bore in which is closely fitted a plug. Advantageously, the bore and the plug are made of conical shape whereby a tight fit may be readily secured. Extending through the plug is a passageway that is aligned with the passageway in the body portion and cooperates therewith to form a path from the extruder to the extrusion die. Positioned in the passageway extending through the plug is a filter assembly. The plug is held in position in the body portion by any suitable securing means, such as bolts or the like. When, in operation, a sufficient amount of dirt or other extraneous matter has accumulated on the filter assembly to warrant its replacement, the extruder is stopped, the plug carrying the filter assembly is removed and is replaced by another plug carrying a clean filter assembly. The filter assembly in the plug which has been removed may then be cleaned to ready said plug for reinsertion into the apparatus. The entire operation of removing and replacing the filter assembly takes but a few minutes, so that the down-time of the extruder during the changing of the filter assembly is kept to a minimum.

It should be understood that instead of having the body portion of the filter change mechanism separate from the extruder and forming die, it may be made integral with either one or the other of these members.

A preferred embodiment of this invention is shown in the accompanying drawings wherein:

Fig. 1 is a cross-sectional view of the filter change mechanism taken along the line 1—1 in Fig. 2 in the direction of the arrows, Fig. 2 is a top plan view, on a reduced scale, of the apparatus shown in Fig. 1, Fig. 3 is a cross-sectional view taken along the line 3—3 in Fig. 1 in the direction of the arrows, and Fig. 4 is an end view, partly in section, taken along the line 4—4 in Fig. 3 in the direction of the arrows.

Referring now to the drawings, the reference numeral 11 designates the outlet end of a conventional extruder which forces a suitable material to the inlet of a forming die 12. Positioned between the extruder 11 and the forming die 12 is a filter change mechanism, indicated generally by reference numeral 13, which is secured to the extruder 11 by means of a split clamping ring 14 and to which the forming die 12 is secured by means of bolts 15. The filter change mechanism 13 comprises a body portion 16 having a passageway 17 extending therethrough. The extruded material emerging from the extruder 11 enters the inlet end 18 of the passageway 17 and emerges from the outlet end 19 of said passageway into the forming die 12.

Extending through the body portion 16 at right angles to the passageway 17 is a conical bore 21 having a conical plug 22 closely fitted therein. The conical plug 22 is provided with a passageway 23 extending therethrough which is aligned with the passageway 17 and cooperates therewith to provide a continuous path for the extruded material from the extruder 11 to the forming die 12. Positioned in the passageway 23 is a filter assembly, indicated generally by the reference numeral 24, through which the extruded material flows and which comprises a breaker plate 25 having a plurality of apertures 26 extending therethrough and screens 27, 28 and 29. The filter assembly bears against a shoulder 31 in the passageway 23 and is held in place by means of a snap ring 32. To keep the filter assembly 24 from rotating due to the twisting action of the extruded material, the passageway 23 is provided, along a portion of its length, with a polygonal cross-section 33 into which the filter assembly 24 is fitted.

The conical plug 22 is held securely in place in the conical bore 21, to prevent leakage of the extruded material past said conical plug, by means of a plurality of bolts 34 that are threaded into the body portion 16 and engage swingable C-washers 35 which are secured to the conical plug 22 by means of bolts 36. To assist in aligning the conical plug 22 accurately in the conical bore 21, there are provided pins 37 that are seated in the body portion 16 and extend through closely fitting apertures 38 in the conical plug 22. When the extruder 11 has been running for some time there is a tendency for the conical plug 22 to stick in the conical bore 21, making its removal quite difficult. For assisting in the removal of the conical plug 22 under these circumstances, there is provided a strap 39 having set screws 41 threaded therethrough and resting on the pins 37. A bolt 42 bearing against a washer 43 extends freely through an aperture 44 in the strap 39 into threaded engagement with the conical plug 22. Tightening of the bolt 42 will tend to raise the conical plug 22, thereby freeing it from the conical bore 21. The entire filter change mechanism 13 is held at the desired temperature by means of a pair of electric heaters 45.

During operation, when sufficient matter has accumulated on the filter assembly 24 to slow down the rate of extrusion seriously or build up an excessive back pressure, the extruder 11 is stopped. The bolts 34 are loosened and the C-washers 35 are swung out from under the heads of said bolts. Then the bolt 42 is turned sufficiently to free the conical plug 22 from the conical bore 21. The conical plug 22, carrying the filter assembly 24, is lifted out of the conical bore 21 and replaced by another conical plug 22 carrying a clean filter assembly 24. The C-washers 35 on said new conical plug 22 are swung under the heads of the bolts 34 and said bolts are tightened, assuring a tight seal between the conical plug 22 and the conical bore 21. Following this series of operations, which takes only a few minutes, the extruder 11 may be placed back into operation. It will be seen that the replacement of the conical plug 22 there is no need to remove or alter the position of the forming die 12, or the take-off or other apparatus associated therewith.

It is to be understood that the foregoing detailed description is given merely by way of illustration and that many variations may be made therein without departing from the spirit of our invention.

Having described our invention, what we desire to secure by Letters Patent is:

1. In an extrusion apparatus, the combination with an extruder and a forming die of a body portion having a passageway into the inlet end of which the extruded material enters from the extruder and from the outlet end of which the extruded material enters into the forming die, said body portion having a bore, a plug positioned in said bore and having a passageway extending therethrough that is aligned with the passageway in the body portion to form a path for the extruded material from the extruder to the forming die, said plug and said bore having interengaging tapered surfaces that form a seal therebetween when the plug is seated in the bore, and a filter assembly positioned in the passageway in the plug for filtering the extruded material, the construction and arrangement being such that the plug carrying the filter assembly may be readily removed and replaced.

2. In an extrusion apparatus, the combination with an extruder and a forming die of a body portion having a passageway into the inlet end of which the extruded material enters from the extruder and from the outlet end of which the extruded material enters into the forming die, said body portion having a conical bore, a conical plug positioned in said bore and having a passageway extending therethrough that is aligned with the passageway in the body portion to form a path for the extruded material from the extruder to the forming die, and a filter assembly positioned in the passageway in the plug for filtering the extruded material, the construction and arrangement being such that the plug carrying the filter assembly may be readily removed and replaced.

3. In an extrusion apparatus, the combination with an extruder and a forming die of a body portion having a passageway into the inlet end of which the extruded material enters from the extruder and from the outlet end of which the extruded material enters into the forming die, said body portion having a conical bore extending therethrough at right angles to said passageway, a conical plug positioned in said bore and having a passageway extending therethrough that is aligned with the passageway in the body portion to form a path for the extruded material from the extruder to the forming die, and a filter assembly positioned in the passageway in the plug for filtering the extruded material, the construction and arrangement being such that the plug carrying the filter assembly may be readily removed and replaced.

4. In an extrusion apparatus, the combination with an extruder and a forming die of a body portion having a passageway into the inlet end of which the extruded material enters from the extruder and from the outlet end of which the extruded material enters into the forming die, said body portion having a conical bore extending therethrough at right angles to said passageway, a conical plug positioned in said bore and having a passageway extending therethrough that is aligned with the passageway in the body portion to form a path for the extruded material from the extruder to the forming die, a filter assembly positioned in the passageway in the plug for filtering the extruded material, and means for releasably securing said plug in said bore, the construction and arrangement being such that the plug carrying the filter assembly may be readily removed and replaced.

5. In an extrusion apparatus, the combination with an extruder and a forming die of a body portion having a passageway into the inlet end of which the extruded material enters from the extruder and from the outlet end of which the extruded material enters into the forming die, said body portion having a conical bore extending therethrough at right angles to said passageway, a conical plug positioned in said bore and having a passageway extending therethrough that is aligned with the passageway in the body portion to form a path for the extruded material from the extruder to the forming die, a filter assembly positioned in the passageway in the plug for filtering the extruded material, and a plurality of bolts releasably securing said plug in said bore, the construction and arrangement being such that the plug carrying the filter assembly may be readily removed and replaced.

6. In an extrusion apparatus, the combination with an extruder and a forming die of a body portion having a passageway into the inlet end of which the extruded material enters from the extruder and from the outlet end of which the extruded material enters into the forming die, said body portion having a conical bore extending therethrough at right angles to said passageway, a conical plug positioned in said bore and having a passageway extending therethrough that is aligned with the passageway in the body portion to form a path for the extruded material from the extruder to the forming die, a filter assembly positioned in the passageway in the plug for filtering the extruded material, a plurality of bolts in threaded engagement with said body portion, and a plurality of C-washers swingably secured to said plug and adapted to be engaged by the heads of said bolts for releasably securing said plug in said bore, the construction and arrangement being such that the plug carrying the filter assembly may be readily removed and replaced.

7. In an extrusion apparatus, the combination with an extruder and a forming die of a body portion having a passageway into the inlet end of which the extruded material enters from the extruder and from the outlet end of which the extruded material enters into the forming die, said body portion having a conical bore extending therethrough at right angles to said passageway, a conical plug positioned in said bore and having a passageway including a length of polygonal cross-section extending therethrough that is aligned with the passageway in the body portion to form a path for the extruded material from the extruder to the forming die, a filter assembly for filtering the extruded material positioned in the portion of the passageway in the plug of polygonal cross-section whereby the filter assembly will not be rotated by the twisting action of the extruded material, a plurality of bolts in threaded engagement with said body portion, and a plurality of C-washers swingably secured to said plug and adapted to be engaged by the heads of said bolts for releasably securing said plug in said bore, the construction and arrangement being such that the plug carrying the filter assembly may be readily removed and replaced.

8. In an extrusion apparatus, the combination with an extruder and a forming die of a body portion having a passageway into the inlet end of which the extruded material enters from the extruder and from the outlet end of which the extruded material enters into the forming die, said body portion having a conical bore extending therethrough at right angles to said passageway, a conical plug positioned in said bore and having a passageway including a length of polygonal cross-section extending therethrough that is aligned with the passageway in the body portion to form a path for the extruded material from the extruder to the forming die, a filter assembly for filtering the extruded material positioned in the portion of the passageway in the plug of polygonal cross-section whereby the filter assembly will not be rotated by the twisting action of the extruded material, a plurality of bolts in threaded engagement with said body portion, a plurality of C-washers swingably secured to said plug and adapted to be engaged by the heads of said bolts for releasably securing said plug in said bore, and heaters for maintaining the body portion and plug at an elevated temperature, the construction and arrangement being such that the plug carrying the filter assembly may be readily removed and replaced.

9. In an extrusion apparatus, the combination with an extruder and a forming die of a body portion having a passageway into the inlet end of which the extruded material enters from the extruder and from the outlet end of which the extruded material enters into the forming die, said body portion having a conical bore extending therethrough at right angles to said passageway, a conical plug positioned in said bore and having a passageway including a length of polygonal cross-section extending therethrough that is aligned with the passageway in the body portion to form a path for the extruded material from the extruder to the forming die, locating pins for aligning the plug accurately in the bore, a filter assembly for filtering the extruded material positioned in the portion of the passageway in the plug of polygonal cross-section whereby the filter assembly will not be rotated by the twisting action of the extruded material, a plurality of bolts in threaded engagement with said body portion, a plurality of C-washers swingably secured to said plug and adapted to be engaged by the heads of said bolts for releasably securing said plug in said bore, and heaters for maintaining the body portion and plug at an elevated temperature, the construction and arrangement being such that the plug carrying the filter assembly may be readily removed and replaced.

10. In an extrusion apparatus, the combination with an extruder and a forming die of a body portion having a passageway into the inlet end of which the extruded material enters from the extruder and from the outlet end of which the extruded material enters into the forming die, said body portion having a conical bore extending therethrough at right angles to said passageway, a conical plug positioned in said bore and having a passageway including a length of polygonal cross-section extending therethrough that is aligned with the passageway in the body portion to form a path for the extruded material from the extruder to the forming die, locating pins for aligning the plug accurately in the bore, a filter assembly for filtering the extruded material positioned in the portion of the passageway in the plug of polygonal cross-section whereby the filter assembly will not be rotated by the twisting action of the extruded material, a plurality of bolts in threaded engagement with said body portion, a plurality of C-washers swingably secured to said plug and adapted to be engaged by the heads of said bolts for releasably securing the plug in said bore, heaters for maintaining the body portion and plug at an elevated temperature, a strap supported on said body portion, and a bolt extending through said strap and engaging said plug for loosening said plug in said bore, the construction and arrangement being such that the plug carrying the filter assembly may be readily removed and replaced.

References Cited in the file of this patent

UNITED STATES PATENTS

| Number | Name | Date |
|---|---|---|
| 499,602 | Snow | June 13, 1893 |
| 642,813 | Cowen | Feb. 6, 1900 |
| 1,898,935 | Brandriff | Feb. 21, 1933 |
| 2,291,212 | Clinefelter | July 28, 1942 |
| 2,294,621 | Kraft | Sept. 1, 1942 |
| 2,341,330 | Parker | Feb. 8, 1944 |
| 2,661,497 | Birmingham | Dec. 8, 1953 |

FOREIGN PATENTS

| Number | Country | Date |
|---|---|---|
| 374,147 | Great Britain | June 6, 1932 |
| 774,212 | France | Dec. 3, 1934 |